(12) United States Patent
Bhargava

(10) Patent No.: US 6,323,625 B1
(45) Date of Patent: *Nov. 27, 2001

(54) TURBINE/ALTERNATOR ON A COMMON SHAFT WITH AN ASSOCIATED ELECTRICAL SYSTEM

(76) Inventor: Brij B. Bhargava, 4596 Sierra Madre Dr., Santa Barbara, CA (US) 93110

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,308
(22) Filed: Jul. 14, 1998

Related U.S. Application Data

(62) Division of application No. PCT/US97/22405, filed on Dec. 3, 1997.
(60) Provisional application No. 60/032,149, filed on Dec. 3, 1996.

(51) Int. Cl.[7] ........................... H02H 9/00
(52) U.S. Cl. ........................ 322/32
(58) Field of Search ............. 322/10, 32; 318/140

(56) References Cited

U.S. PATENT DOCUMENTS

| | | | |
|---|---|---|---|
| 4,119,861 | * 10/1978 | Gocho | 290/13 |
| 4,219,739 | 8/1980 | Greenwell | 322/29 |
| 5,036,267 | * 7/1991 | Markunas et al. | 322/10 |
| 5,055,764 | * 10/1991 | Rozman et al. | 322/10 |
| 5,497,615 | 3/1996 | Noe et al. | 60/39.511 |
| 5,581,168 | * 12/1996 | Rozman et al. | 318/723 |
| 5,694,026 | 12/1997 | Blanchet | 322/29 |
| 5,801,470 | * 9/1998 | Johnson et al. | 310/156 |
| 5,903,116 | * 5/1999 | Geis et al. | 318/140 |

FOREIGN PATENT DOCUMENTS

WO9825014   12/1997   (WO).

* cited by examiner

*Primary Examiner*—Elvin Enad
*Assistant Examiner*—Peter Medley
(74) *Attorney, Agent, or Firm*—Koppel & Jacobs; Michael J. Ram

(57) ABSTRACT

An electrical system for a turbine/alternator comprising a gas driven turbine and permanent magnet alternator rotor rotating on a common shaft and comprising an inverter circuit connected either to an AC output circuit or the stator windings of the alternator. A control circuit during start-up mode connects the inverter circuit to the stator windings of the alternator and during the power generation mode it switches and connects the inverter circuit to the AC output circuit. Thus, during the start-up mode, the alternator functions as a motor to raise the speed of the turbine to a safe ignition speed and in the power generation mode the system provides power through the AC output circuit, electrical power having a frequency and voltage unrelated to the rotational speed of the turbine/alternator.

26 Claims, 8 Drawing Sheets

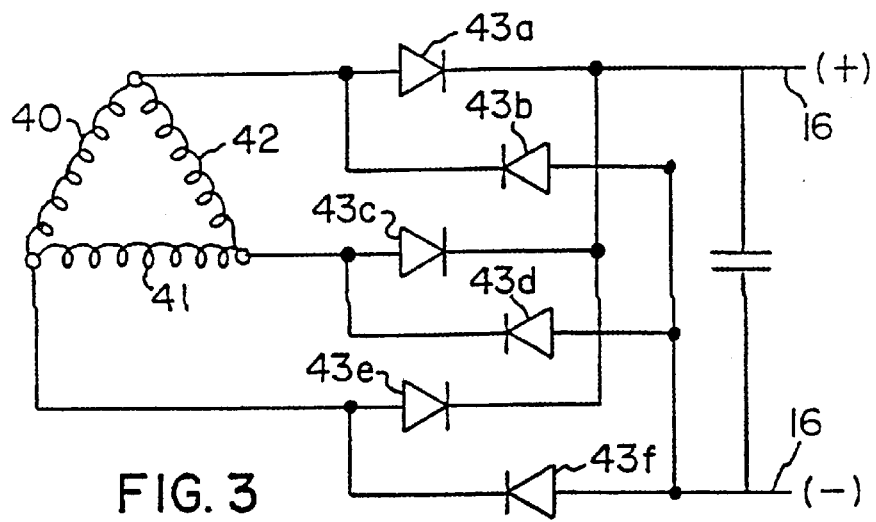
FIG. 3
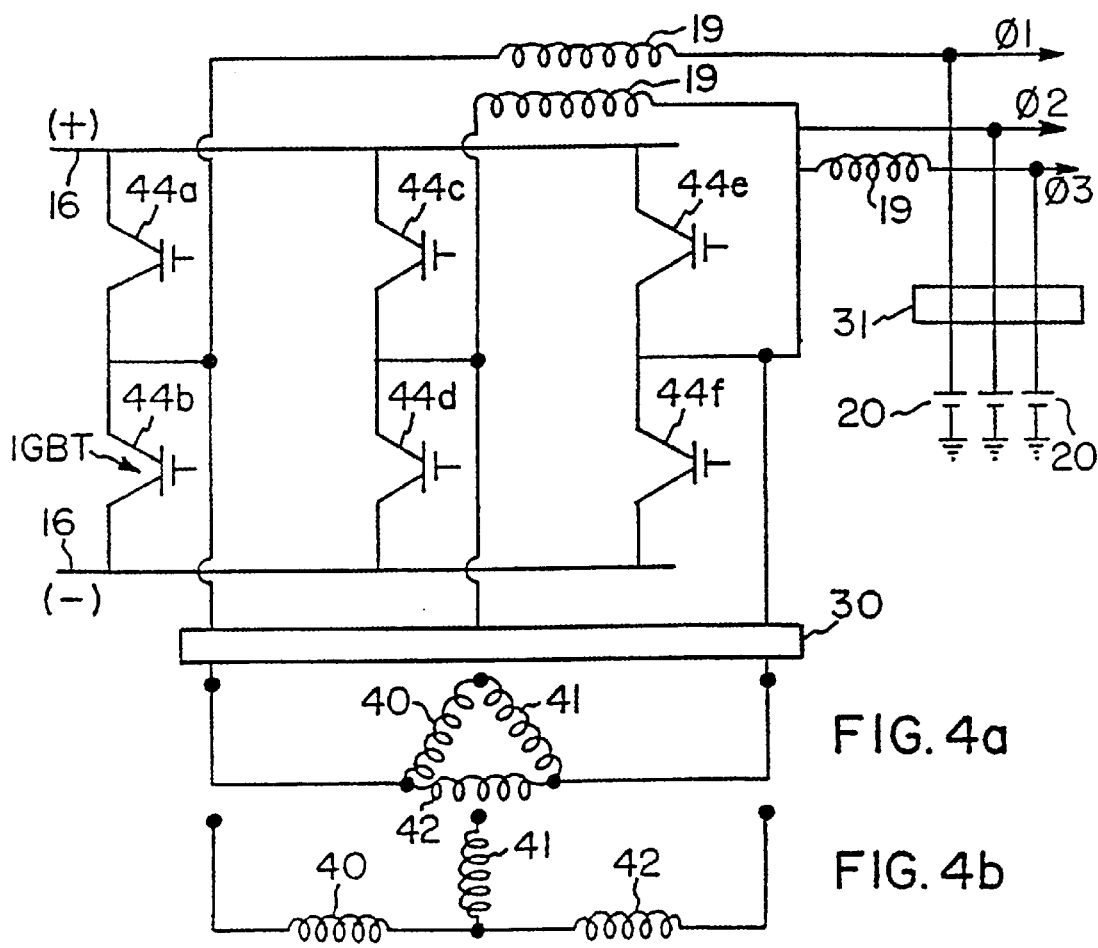
FIG. 4a
FIG. 4b

TURBINE/ALTERNATOR ON A COMMON SHAFT WITH AN ASSOCIATED ELECTRICAL SYSTEM

CROSS REFERENCES TO RELATED APPLICATIONS

This is a divisional of PCT/US97/22405 filed Dec. 3, 1997 published Jun. 11, 1998 as WO 98/25014, which has priority from Provision Application 60/032,149 filed Dec. 3, 1996.

BACKGROUND OF THE INVENTION

Gas turbines must be driven to rotate at a starting speed by auxiliary means prior to fuel injection and ignition and self-sustained operation. In the past, for example, gear box systems driven by auxiliary electric or compressed air motors have been used to rotate the turbine to starting speed. "Air" impingement starting systems have also been used with small turbines and operated by directing a stream of gas, typically air, onto the turbine or compressor wheel to cause rotation of the main rotor. These prior art systems are complex and difficult to implement.

Electrical power may be generated by using a gas turbine to drive an alternator. The alternator may be driven by a free turbine which is coupled to the rotor of the alternator or through a gear box. In these conventional systems, the speed of the turbine must be precisely controlled to maintain the desired frequency and voltage of the generated alternating current output power. Hence, both the output voltage and frequency are fixed for a given system.

SUMMARY OF THE INVENTION

In accordance with the present invention, an alternator having a permanent magnet rotor is connected to the main turbine rotor making possible both starting of the turbine as well as generation of electrical power. The electrical system described herein allows the rotor to operate at various speeds with the output power frequency and voltage unrelated to the turbine/alternator rotor speed. The electrical system incorporates a unique inverter, which yields the appropriate voltage and frequency in both the start-up mode of operation as well as in the power generation mode of operation.

The electrical system is used to cause rotation of the turbine during start-up mode and subsequently is used to extract electrical power from the alternator after the turbine has reached its normal operating conditions. At start-up, the alternator functions as an electric motor or starter. The functions of the electrical system at start-up comprise power boost, power input to the alternator. Both the frequency and voltages are controlled as a function of time and rotational speed. Electrical power for the electrical system is obtained during start-up from either a DC source, such as a battery, or from an AC power line. The start-up circuit may function as an open loop control system or as a closed loop control system based upon rotor position feedback.

As the turbine approaches normal operating conditions at very high speeds of rotation powered through the controlled combustion of fuel and air, the electronic circuitry used to initially drive the alternator as a motor is automatically reconfigured to accept power from the alternator. Subsequently, alternator generates three-phase electrical power which becomes available for extraction from the electrical system at desired voltages and frequencies.

Briefly, according to this invention, an electrical system for a turbine/alternator comprises of a gas driven turbine and alternator rotating on a common shaft. Essentially, the alternator rotor rotates at the same speed as the turbine at any given time. The alternator has a permanent magnet rotor and a stator winding. A stator circuit is connected to the stator winding. A DC bus powers an inverter circuit. The output of the inverter circuit is connected to an AC output circuit or through a first contactor to the stator circuit. A rectifier is connected between the stator circuit and the DC bus. A signal generator is driven by signals derived from the rotation of the common shaft and an open loop waveform generator produces waveforms independent of the rotation of the common shaft. A second contactor connects either the signal generator or the open loop waveform generator to a driver connected to cause switching of the inverter circuit. A temporary power supply supplies energy to the DC bus. A control circuit, during a start-up mode, switches the first contactor to connect the inverter circuit to the stator circuit and switches the second contactor to connect the signal generator to the driver, preferably a pulse width modulator. The control circuit, during power generation mode, switches the first contactor to disconnect the inverter from the stator circuit and switches the second contactor to connect the open loop waveform generator to the driver. During the start-up mode, the alternator functions as a motor to raise the speed of the turbine to a safe ignition speed. The inverter is used to commutate the stator windings in response to the signal from the signal generator. During power generation mode, the inverter is used to convert the rectified output of the alternator into AC signals applied to the AC output circuit in response to the open loop waveform generator, thus producing electric power having a frequency unrelated to the rotational speed of the alternator.

According to a preferred embodiment, an electrical system for a turbine/alternator comprises a gas driven turbine and alternator rotating on a common shaft. The alternator is comprised of a permanent magnet rotor and a stator winding. The stator winding is connected through a contactor to an inverter circuit. The inverter circuit is connected to a DC bus. The inverter circuit is also connected to a signal generator. A position encoder is connected to the drive shaft of the turbine/alternator. Its output is also connected to the signal generator. The inverter processes the DC bus voltage and signal generator output to develop three-phase AC output voltages. The signal generator controls the inverter output frequency. Concurrently, a variable voltage DC power supply applies a time variant voltage to the DC bus. The DC bus voltage controls the inverter output voltage level. Thus, the output frequencies and voltages of the inverter are regulated and controlled. During the start-up mode, the output of the inverter is applied through a contactor to the alternator which functions as an electric motor. When the start-up mode is initiated, the DC power supply voltage begins to ramp up from 0 volts. The signal generator output frequency is set to a desired low frequency. As the DC bus voltage begins to increase, the alternator rotor begins to rotate at a low speed. The encoder senses shaft position changes and sends this information to the signal generator. The signal generator processes this information and begins to ramp up its output frequency as a function of turbine engine speed. This increasing frequency is directed to the inverter where it is used to control the frequency of the inverter output voltage. This controlled process results in a time variant inverter output whose frequency and voltage are applied through a contactor to the alternator. As a result, the alternator functions as a motor and accelerates the speed of the turbine shaft to a value suitable for ignition. Once the turbine has reached its normal operating speed, the variable voltage power supply is deactivated. Further, the shaft position encoder signal is disconnected from the signal generator and is replaced buy a precision, fixed time base signal. Subsequently, the alternator AC output voltage is rectified and the resulting DC output voltages are applied to the DC bus. This reconfiguration permits the inverter to operate as a fixed frequency power output source independent of turbine rotor speed. In the power output mode, the inverter provides power through output filters. The filtered output power is then connected to a contactor, which directs it to a set of terminals where it is available for consumer use. A control system integrates operation of the inverter, power supply, signal generator and contactors during both the start-up and power generation modes of operation. During the power generation mode of operation, the control system continuously measures output voltages from the inverter and sends signals to the signal generator to compensate for output voltage fluctuations caused by varying output load, turbine/alternator speed, and other conditions. Thus, the output voltage is regulated electronically.

According to a preferred embodiment, the signal generator is a pulse width modulator. Typically, the stator winding of the alternator is a three-phase winding and the inverter circuit and the PC circuits are three-phase circuit.

According to a preferred embodiment, the electrical system comprises a battery powered supply circuit including a battery and a boost inverter circuit to provide the DC bus a voltage between 0 volt and that required by the inverter to power the alternator to safe ignition speeds. According to another preferred circuit, the battery powered supply circuit comprises a step-down circuit for recharging the battery and for powering low voltage devices such as fans and pumps from the DC bus during the power generation mode.

As an alternate approach, the system using a DSP (Digital Signal Processor) based controller and IGBT converter can be used. In this concept, DSP controller takes the voltages and currents as the inputs and generates PWM gating signals as the outputs sending to the power electronics converter. First, the converter circuit acts as an inverter to power the alternator as a motor or starter to ramp up the speed. After the turbine is ignited, and has reached its normal operating speed, the power electronics converter acts as a synchronous rectifier to supply generated power to the DC bus. The gating signals from the DSP controller are used to regulate and stabilize the output voltage and frequency in variable speed operation. The rotor position sensors are not required with the DSP controller.

BRIEF DESCRIPTION OF THE DRAWINGS

Further features and other objects and advantages will become clear from the following detailed description made with reference to the drawings in which:

FIG. 3 schematically illustrates a rectifier circuit for converting the alternator AC output to the DC output connected to the DC bus. The schematic shows a delta connected winding;

FIGS. 4a and 4b schematically illustrate the inverter circuit comprised of six IGBT switches used to commutate the current to the alternator during the start-up mode and to provide three-phase output during the power generation mode, both delta and star configurations are shown;

DESCRIPTION OF THE PREFERRED EMBODIMENTS

Figure 1:
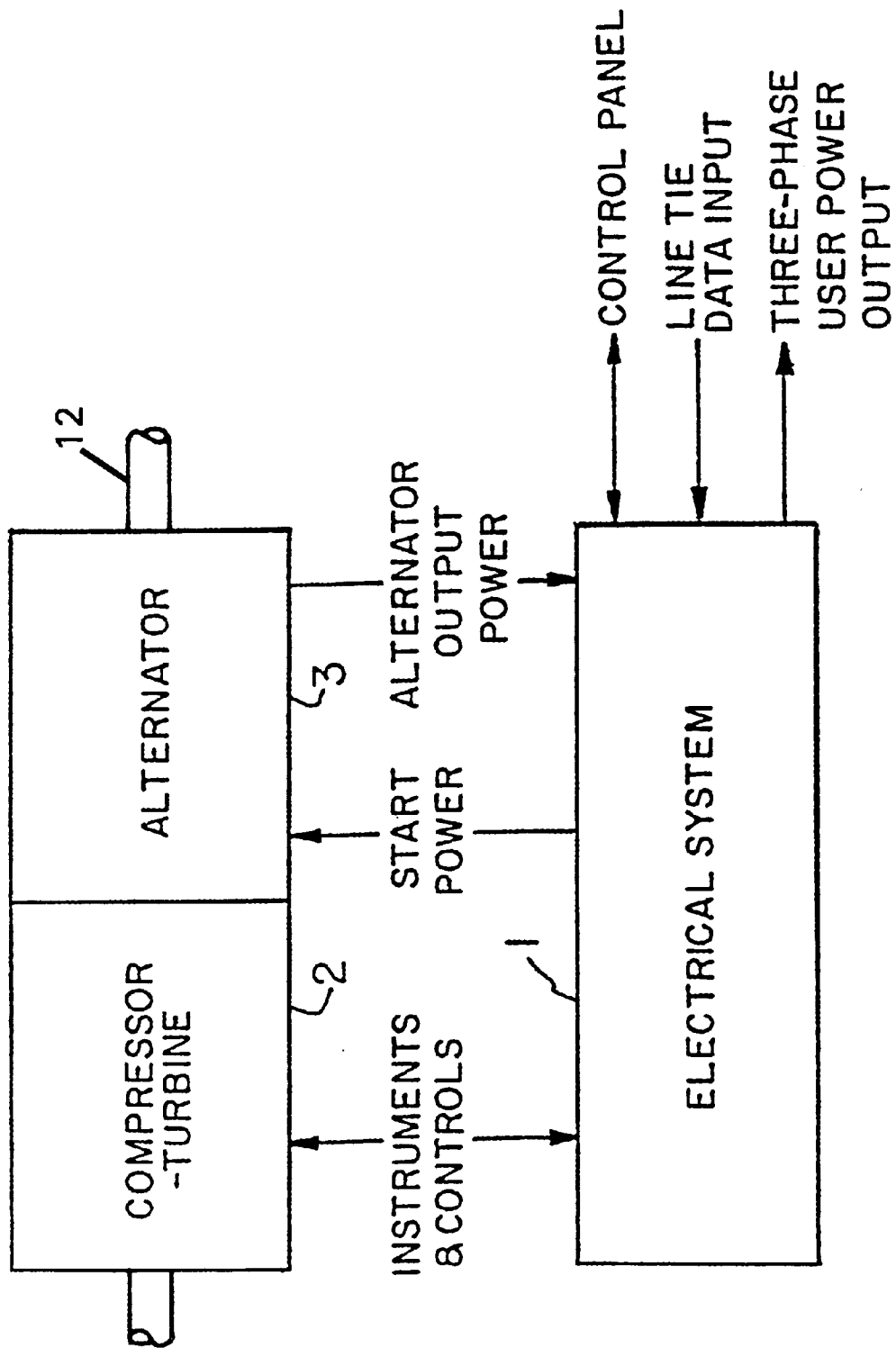
FIG. 1 is a schematic drawing showing the overall relationship of the electrical system to the gas turbine/alternator

FIG. 1 illustrates the relationship between the electrical control system 1, according to this invention, and the power generation system comprising a gas turbine 2 and an alternator 3. The alternator rotor is mounted on a shaft 12 common with the turbine shaft. The electrical control system interacts with the power generation system to provide start-up power, engine control, signal processing, battery charging, user interfaces, as well as power conversion and control for generated power output for the user. Both stand-alone and line tie operations are facilitated.

Figure 8:
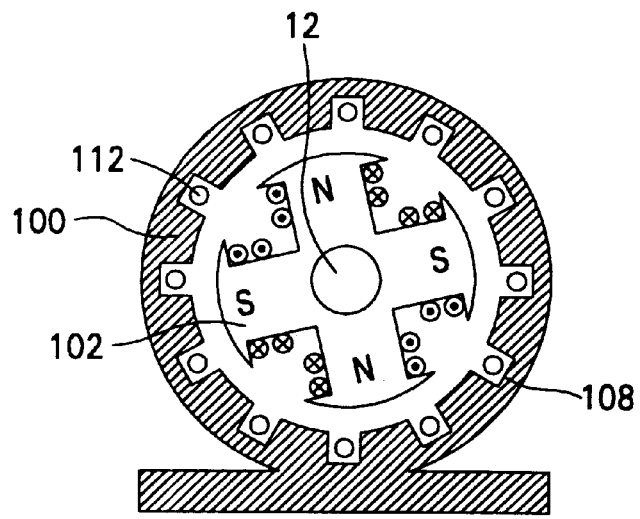
FIG. 8 is a schematic cutaway end view of a four-pole synchronous generator shown in the prior art.
Figure 9:
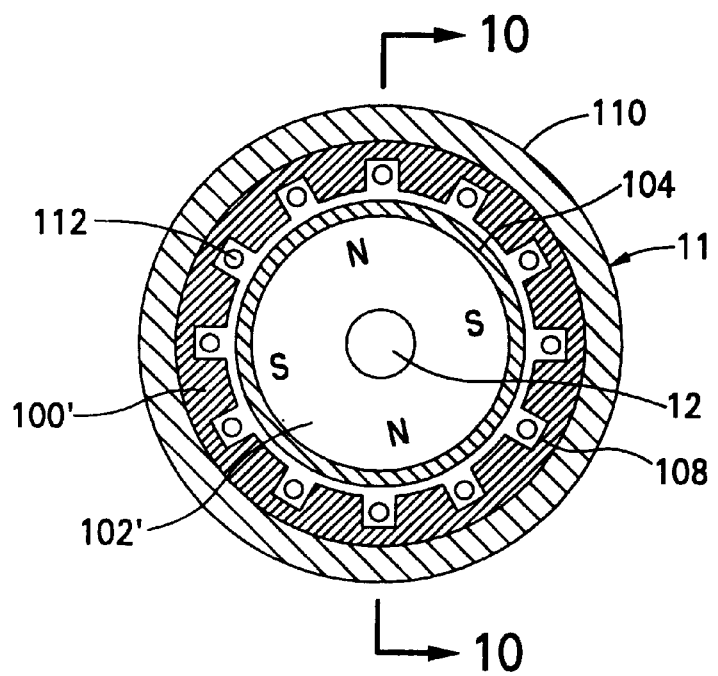
FIG. 9 is a schematic of the generator of FIG. 8 altered to show features of the invention in the alternator of FIG. 1.
Figure 10:
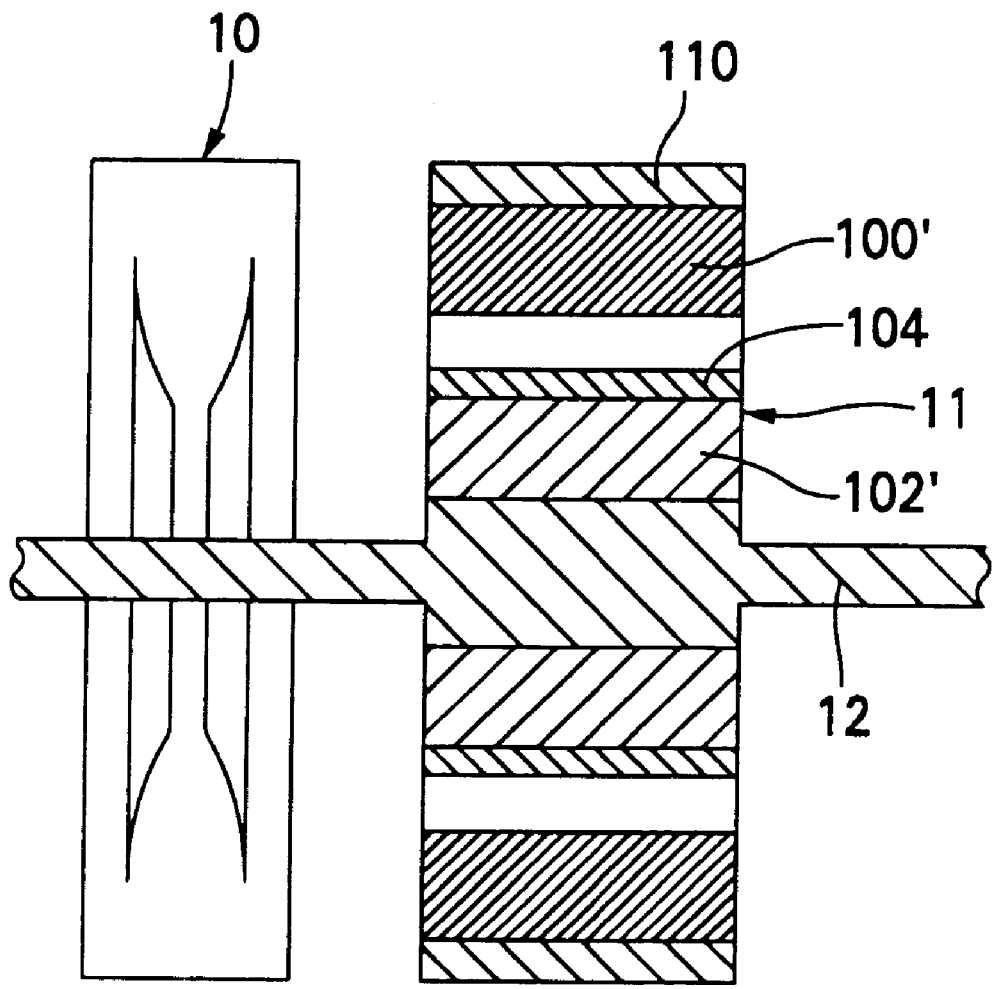
FIG. 10 is an alternative schematic representation of the gas turbine/alternator combination of FIG. 1 incorporating features of the invention, the alternator of FIG. 9 being shown in cross section along line 9—9 of FIG. 9.

FIG. 8 shows a prior art synchronous generator design as set forth in *The Electrical Engineering Handbook*, Dorf, Richard C., Ed. CRC Press, 1993, p 1322–1323. The four-pole generator incorporates a rotor 102 mounted on a shaft 12 and a stator 100 with windings 112 in the stator slots 108. FIG. 9 shows the prior art generator of FIG. 8 including several features added as part of the invention. FIG. 10 is a schematic cross sectional representation of the compressor turbine 2 and alternator 3 combination shown in FIGS. 1 and 2 mounted on the common shaft 12.

Figure 2:
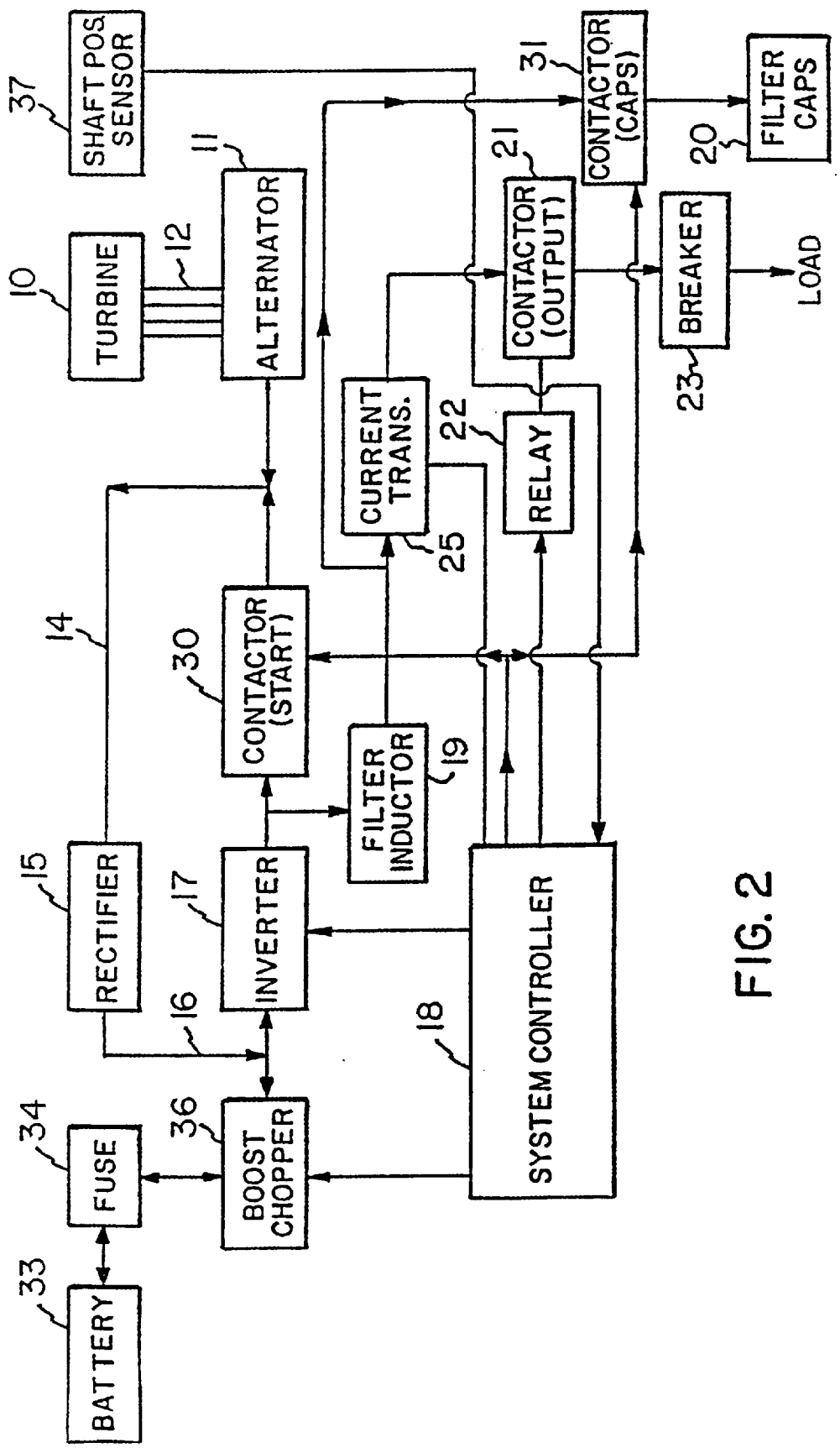
FIG. 2 is a schematic drawing showing the electrical system for providing electrical power to the alternator during the start-up mode and supplying the power to the load during the power generation mode.

Referring now to FIG. 2, the general arrangement of the electrical power circuits for a turbine generator, according to this invention, is depicted. The turbine 10 is connected to the rare earth permanent magnet alternator 11 by a common shaft 12. The alternator is shown in FIGS. 9 and 10. The stator 100' is manufactured using a low loss, high permeability material core, usually a stack of high quality, low loss, electrical steel laminations. The stack contains a three-phase distributed winding 112 in the stator slots 108 with a housing with provision for liquid or air cooling 110. Cooling is critical to the performance of the alternator. In the currently implemented embodiment, the rotor 102' is a four pole permanent magnet rotor having the following dimensions: active length 3.55 inches; diameter under magnets 1.00 inch; diameter over the magnets 1.43 inches; weight of magnets 0.70 pounds, and rotor weight 1.95 pounds, To retain the magnets in place at high speeds, under the rotational environment of centripetal force, a high strength composite sleeve 104 or non magnetic material ring is used.

The three-phase stator windings of the alternator are connected by AC bus 14 to a rectifier 15. The output of the rectifier is connected to DC bus 16. During power generation, that is, the power out mode when the turbine is driving the alternator, the three-phase output from the AC bus is rectified by the rectifier assembly providing DC power to the DC bus. The DC power is applied to inverter 17. The inverter 17 during the power generation mode switches the DC power to provide three-phase output having a frequency unrelated to the rotational speed of the turbine/alternator rotor. The frequency is controlled by signals from the system controller 18. The inverter output is filtered by inductors 19 and capacitors 20. The filtered three-phase output is connected to a load through output contactor 21 (controlled by the system controller 18 through relay 22) and output breakers 23.

A current transformer 25 senses output current which is fed back to the system controller 18 enabling current limit and power balancing of the three-phase inverter output.

In order to start the turbine, it is necessary to accelerate it to a suitable ignition speed. During the start-up mode, the output of the inverter 17 is connected to the stator windings of the alternator 11 through start contactor 30 which is controlled by the system controller 18. At the same time, the capacitor contactor 31 removes the filter capacitors 20 from the output circuit. Because of the very high frequencies during start-up, it is necessary to remove the filter capacitors 20 from the stator, which is oil cooled, circuits.

During start-up, DC power is drawn from the battery 33 through fuse 34 and is applied to boost chopper 26. The boost chopper ramps the voltage of the DC battery power from 0 to a voltage which, when converted to AC by the inverter 17, will drive the alternator as a motor at a speed that will enable safe ignition of the turbine. Preferably, a shaft position sensor 37 generates a signal which is applied to the system controller 18 which in turn uses the signal to control the inverter 17 to generate a three-phase output which commutates the stator windings of the alternator to ramp the alternator and turbine up to ignition speed.

Referring to FIG. 3, a suitable rectifier circuit is schematically illustrated. The three-phase stator windings 40, 41, 42, delta connected, are connected as illustrated by six diodes 43a, 43b, 43c, 43d, 43e, 43f to the DC bus 16.

Referring to FIGS. 4a and 4b, a suitable inverter circuit is schematically illustrated. (FIG. 4a illustrates a delta connection and FIG. 4b a star connection for the stator winding). The inverter comprises six solid state (IGBT) switches which, during the start-up mode, can alternately connect one corner of the delta connected stator windings to the plus or minus side of the DC bus 16 through contactor 30. Also, the solid state switches 44a, 44b, 44c, 44d, 44e, 44f connect either the plus or minus side of the DC bus to the filter inductors 19 at all times and after start-up to the filter capacitors 20 through contactor 31. The inverter is used to generate three-phase output signals. It is capable of providing a wide variety of output voltages and frequencies as controlled by a microprocessor in the system controller. The output inverter is used in two distinctly different ways during start-up and power out operations of the power generation system.

During the start-up phase, the inverter is used to output time variant voltages and frequencies needed to drive the alternator as a motor and to accelerate the alternator/turbine drive shaft to rotational speeds necessary for sustained operation of the power generation system. In its present configuration, this requires three-phase voltages ranging from 0 up to 350 volts at frequencies from near 0 and up to 2 kHz.

During the power generation phase, the inverter is used to supply three-phase voltages consistent with user power requirements. Typical voltages are 480 vac, 240 vac, 208 vac, 120 vac at frequencies of 50 Hz, 60 Hz and 400 Hz. This system is not limited to these values and a nearly infinite range of voltages and frequencies could be selected if desired.

Certain applications of the power generation system require the output inverter to be capable of line tie to an existing power grid. Line phasing circuitry is used in conjunction with a system controller to monitor the phase of the power grid voltage and synchronize the power generation system to it. In like manner, the system controller can monitor power grid voltage amplitudes and adjust the power generation system output to facilitate and control the transfer of power to the grid.

Figure 5:
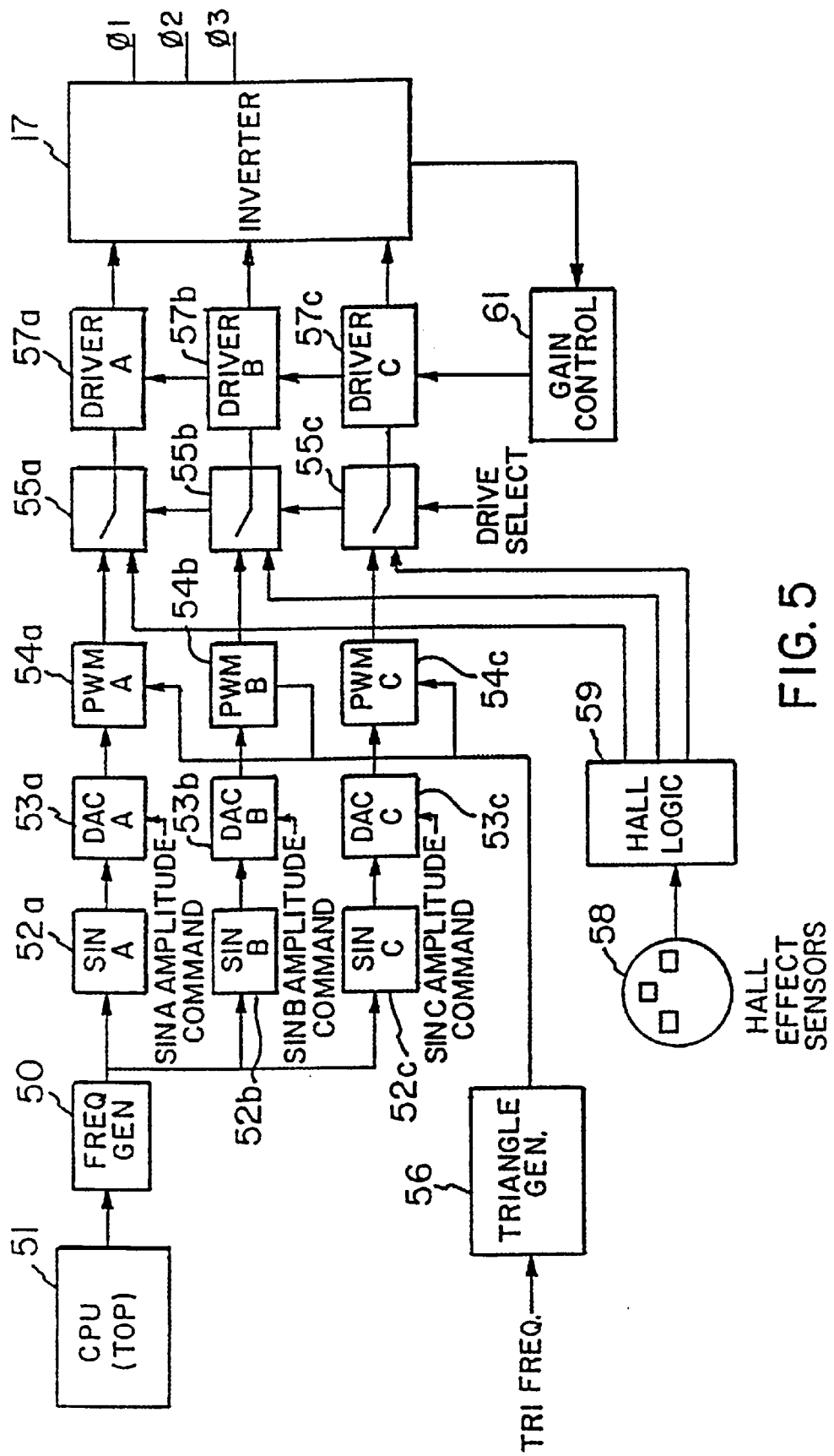
FIG. 5 schematically illustrates the open loop waveform generator and closed loop driver for the inverter circuit.

FIG. 5 schematically illustrates the portion of the system controller for generating an open loop waveform for driving the inverter 17. Frequency generator 50 generates output pulses at frequencies selectable between 250 Hz and 600 kHz by the CPU 51. These pulses are applied to advance the output in sine wave PROMs (programmable read only memories) 52a, 52b, 52c. The outputs from the sine wave PROMs (basically a 256K lookup table) are phase shifted from each other exactly 120° apart. The output from the PROMs are applied to digital-to-analog converters 53a, 53b, 53c producing three analog sine waves. The amplitude of each waveform out of digital-to-analog converter is individually controlled by a sine wave (amplitude) command. The sine waves are then compared inputs width modulators 54a, 54b, 54c with a triangle wave from a triangle wave generator. The frequency of the triangle wave generator is controlled. The pulse width modulated waveforms are then applied through drive select gates 55a, 55b, 55c to drivers 57a, 57b, 57c. In the currently implemented embodiment, the drivers produce three complimentary pairs of pulse signals for controlling the inverter. The waveform generator is used to drive the inverter during the power generation mode when the turbine is driving the alternator. The waveform circuit, so far as described, is open loop. In other words, it is not controlled by alternator rotor speed. However, various feedback signals can be used to adjust the amplitude of signals out of the digital-to-analog converter. While the waveform circuit is principally used to drive the inverter during the power generation mode, it may be used to control the inverter at the very beginning of the start-up mode to cause the alternator rotor to rotate at least once. This permits phasing of the Hall effect sensor signals.

Three Hall effect switches 58 are mounted to pick up magnetic pulses 120° apart as the common shaft rotates. These signals are processed by a Hall logic circuit 59 to produce a pair of signals corresponding to each pickup pulse. The three pairs of signals are gated by the drive select gates 55a, 55b, 55c to the drivers 57a, 57b, 57c. The position sensor system consists of permanent magnets and Hall effect sensors, which are used during turbine engine start-up to commutate electrical power to the stator windings of the alternator. Phasing of the sensors is accomplished at the beginning of the start-up phase by briefly rotating the turbine alternator shaft in the direction of normal rotation. Rotation of the shaft during this initial period of the start-up phase is accomplished by the microcomputer control of the output inverter system in an open loop configuration that does not utilize the Hall effect sensors. Once phasing of the sensors has been completed, their signals are directed to the output inverter section of the system to facilitate start-up of the turbine engine under closed loop control. The Hall effect pickups enable a closed loop commutation of the inverter 17 and the stator windings of the alternator. Gain control circuit 61 processes feedback from the inverter circuit 17 to adjust the gain of the driver circuits to balance the output of the three phases output from the inverter 17.

Figure 6:
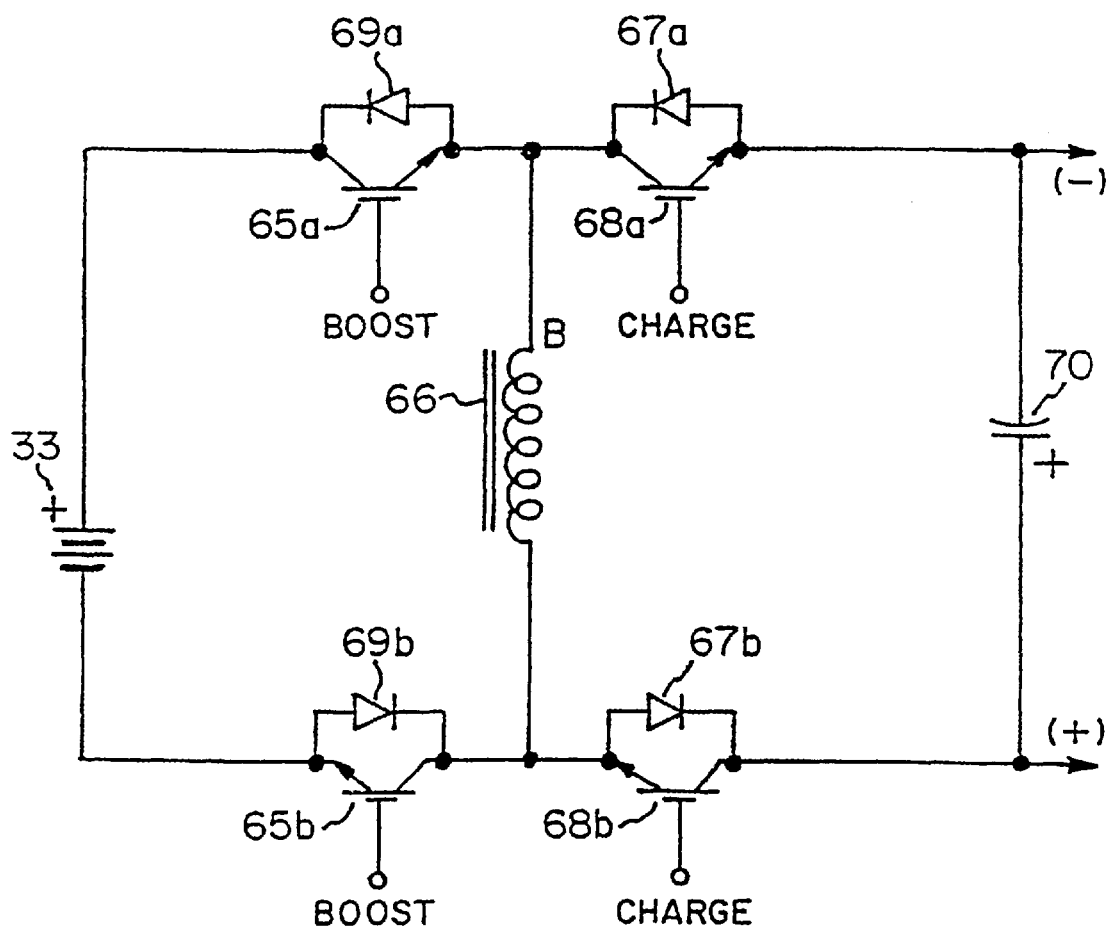
FIG. 6 illustrates a boost/buck chopper suitable for using battery power during the start-up mode to power the DC bus and for charging the battery from the DC bus during the power generation mode.

During the start-up mode, the battery supplies power to the DC bus through the boost chopper. FIG. 6 is a schematic of a boost chopper for supplying the DC bus with a voltage in the range of 0 to 350 volts from a 12 or 24 volt battery during the start-up mode. When the boost chopper switches 65a and 65b are closed (conducting) current flows in inductor 66. When the switches 65a and 65b open, the magnetic field in the inductor collapses driving end A of the inductor very positive with respect to end B and supplying current through diodes 67a and 67b to the positive and negative sides of the DC bus, respectively. The switches 65a and 65b are driven at 4 kHz. The duty cycle is controlled from 0 to 100% enabling the output voltage across DC bus capacitors 70 to vary from 0 to 350 volts. The use of a boost from 0 to 350 volts enables a gradual increase in the rotational speed of the alternator during start-up.

During the power generation mode, the battery is charged by a charger circuit. Charger switches 68a and 68b are switched at about 1 kHz. The duty cycle is adjustable. When the charger switches 68a and 68b are closed, current from the DC bus flows through inductor 66. When the charger switches are opened, side B of the inductor goes positive with respect to side A and charges the battery, drawing current through diodes 69a and 69b. It is not necessary, as illustrated here, that the boost and charger circuits share the same inductor.

Figure 7:
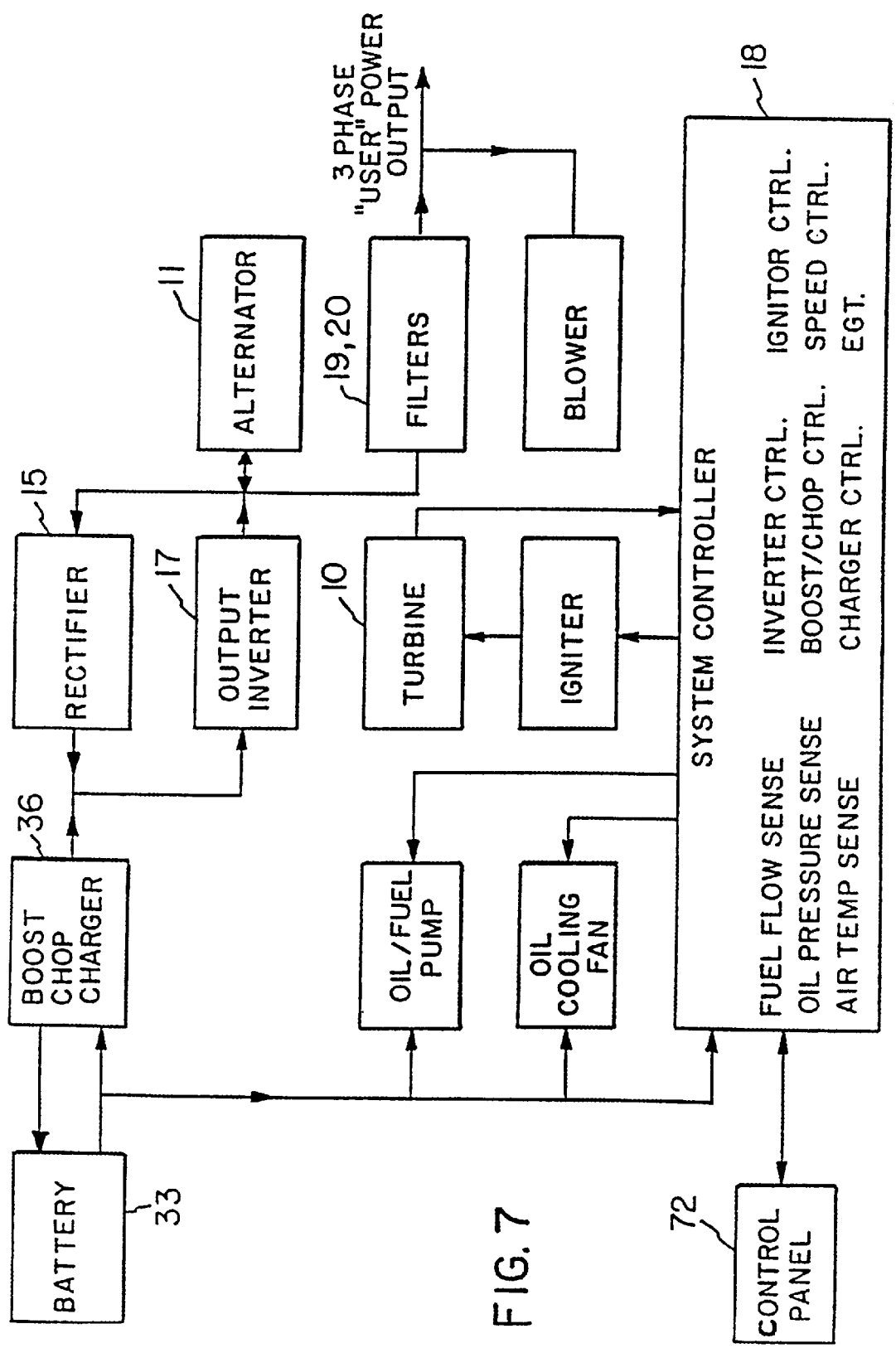
FIG. 7 schematically illustrates the entire electrical system including turbine sensors and turbine controls.

FIG. 7 illustrates the interaction between the system controller and the gas turbine. The system controller utilizes three microprocessors that communicate with each other through a high speed serial link and provide the following functions: (1) control of the electrical power required to rotate the turbine rotor up to speeds necessary to sustain operation of the turbine; (2) process and control of the electrical power generated by the alternator during power generation mode of operation to provide three-phase output power at common line voltages and frequencies; (3) control of other subsystems needed to operate the power generation system, such as the ignitor, cooling fans, fuel and oil pumps; (4) signal conditioning and control of instrumentation for measurement of pressures, temperatures, flow, and rotor speed; and (5) generation and control of a control panel providing a user interface for system operation with self protection and diagnostics and with remote communication and control capability.

The three microprocessors each have their own associated memory programmed to run independently. One microprocessor is directed to monitoring the keypad, display and RS323 communicators. A second microprocessor is devoted to monitoring the turbine parameters, to actuate fault trips and to log a history of operation parameters for several hours of operation. The third microprocessor monitors the electrical parameters like frequencies, voltages, and directs circuit selection and actuates relays, etc.

OPERATION

There are two distinct modes of system operation. In the first mode, the system controller 18 is used to control the boost chopper 36 and output inverter 17 to vary the output voltage and frequency as a function of time. Operating in this manner, the alternator is utilized as a variable speed motor to rotate the engine at speeds required for the gas turbine's sustained operation. In the second mode of operation, the inverter section is automatically reconfigured by the system controller 18 for providing user power output. In this mode of operation, high frequency AC power by the rectifier 15 and applied to the input of the inverter. The inverter, in conjunction with the system controller, provides the desired three-phase output voltages and frequencies required for a given user application. The output voltage, frequency, and phase sequence is controlled in a manner which is consistent with both stand-alone and line tie user applications.

The control panel 72 provides the interface between the user and the controller. It provides the user with various control and instrumentation options, such as start-up, shut down, line tie and diagnostics. During both normal start-up and power generation modes of operation of the system, the system controller control sequences are as follows:

1) On command from the control panel 72, the controller 18 sends appropriate commands to the waveform generators and boost chopper to initiate brief rotation of the turbine/alternator so that the Hall position sensors are properly phased for subsequent start-up functions.

2) Next, the controller controls the boost chopper 36 and the waveform generator (see items 50 to 54 and 58 in FIG. 5) to ramp up the three-phase voltages and frequencies to the inverter. The three-phase outputs are directed to the alternator which responds by accelerating the rotation of alternator rotor, hence the turbine shaft to speeds necessary for its sustained operation.

3) During the above start-up sequence, the system controller monitors and controls other functions, such as fuel flow, ignition, turbine/alternator speed, temperatures and pressures.

4) Following the start-up phase, the system controller reconfigures the boost chopper to operate as a battery charger. In addition, the waveform generator is reset to provide signals needed for generation of user power output requirements. These signals are connected to the input of the selector switch where they are directed to the drivers and inverter. As a result, the inverter provides the three-phase output power at desired voltage and frequency.

5) During normal power out operation as described in 4) above, the system controller monitors and controls all functions necessary for control of the power generation system including, but not limited to, control and/or monitoring of fuel flow, temperature, pressure, speed, run time and various diagnostics unique to the components of the complete power generation system.

Having thus described the invention in detail and particularity Required by the Patent Laws, what is desired protected by Letters Patent is set forth in the following claims.

What is claimed is:

1. A high speed turbine/alternator system for generation of electric power, comprising:

a gas driven turbine system;

an alternator having a permanent magnet rotor and a stator;

a shaft which is coupled in common to said turbine system and said rotor;

an m-pole permanent magnet system carried by said rotor;

an annular retention system arranged over said rotor to oppose centripetal force and retain said magnet system in place;

a high permeability core included in said stator;

a slot system defined by said core;

an n-phase distributed winding carried in said slot system; and an electrical system;

wherein electromagnetic interaction that generates n-phase AC signals in response to rotation of said rotor by said turbine system is limited to said m-pole permanent magnet system and said n-phase distributed winding;

and wherein said electrical system is configured to facilitate rotation of said rotor in a start-up operational mode of said turbine/alternator system and to extract said electric power from said n-phase AC signals during a power generation operational mode of said turbine/alternator system.

2. The turbine/alternator system according to claim 1 in which said shaft forces said permanent magnet rotor to rotate at the same speed as said gas driven turbine system at any given time, wherein said permanent magnets are formed of a rare earth material, and said electrical system includes:
   a) an AC output circuit;
   b) an inverter circuit connected to said AC output circuit;
   c) a first contactor for connecting said inverter circuit to said n-phase distributed windings;
   d) a DC bus connected to said inverter circuit;
   e) a rectifier connected between said n-phase distributed windings and said DC bus;
   f) a power supply circuit connected to said DC bus, operational during said start-up operational mode;
   g) a driver connected to cause switching of said inverter circuit;
   h) a signal generator driven by signals derived from the rotation of said shaft;
   i) an open loop waveform generator;
   j) a second contactor for connecting a selected one of said signal generator and said open loop waveform generator to said driver; and
   k) a control circuit for, during said start-up operational mode, switching said first contactor to connect said inverter circuit to said n-phase distributed windings and switching said second contactor to connect said signal generator to said driver and during said power generation operational mode switching said first contactor to disconnect said inverter circuit from said n-phase distributed windings and switching said second contactor to connect said open loop waveform generator to said driver;

whereby during said start-up operational mode, said alternator functions as a motor to raise the speed of said turbine system to a safe ignition speed and in said power generation operational mode, said AC output circuit delivers said electric power with a frequency and voltage unrelated to the rotational speed of said shaft.

3. The turbine/alternator system according to claim 2, wherein said n-phase distributed winding and said electrical system are both a selected one of single-phase or poly-phase circuits.

4. The turbine/alternator system according to claim 2, wherein said electrical system includes microprocessors to control, monitor, and communicate all system functions and parameters for its normal operation.

5. The turbine/alternator system according to claim 2, wherein said power supply circuit comprises a battery and a boost circuit to provide to said DC bus a voltage between 0 volts and that voltage required by said inverter to raise the turbine/alternator speed to safe turbine ignition speed.

6. The turbine/alternator system according to claim 5, wherein said power supply circuit comprises a frequency pulse width modulator for driving said boost circuit.

7. The turbine/alternator system according to claim 6, wherein said control circuit controls the duty cycle of said pulse width modulator to regulate the voltage to said DC bus.

8. The turbine/alternator system according to claim 6, wherein said power supply circuit comprises a battery, a charger circuit and a constant frequency pulse width modulator for driving said charger circuit and adjusting the duty cycle of said pulse width modulator to control the charging voltage of said battery.

9. The turbine/alternator system according to claim 2, wherein said drive is a pulse width modulated driver.

10. The turbine/alternator system according to claim 2, wherein said power supply circuit comprises a battery and a step down circuit for recharging said battery during said power generation operational mode.

11. The turbine/alternator system according to claim 2, wherein said control circuit utilizes a Digital Signal Processor control in conjunction with an IGBT converter to control, monitor, and communicate all system functions and parameters for its normal operation.

12. The turbine/alternator system of claim 1, wherein said annular retention system includes a composite sleeve positioned about said magnet system.

13. The turbine/alternator system of claim 1, wherein said annular retention system includes a non-magnetic ring positioned about said magnet system.

14. The turbine/alternator system of claim 1, wherein said core is comprised of electrical steel laminations.

15. The turbine/alternator system of claim 1, wherein said alternator includes a selected one of a liquid and a gas cooling system configured to cool said stator.

16. A high-speed turbine/alternator system for generation of electric power, comprising:
   a shaft;
   a turbine system directly fixed to said shaft;
   an alternator that has a stator that carries an n-phase distributed winding and further has a rotor that is directly fixed to said shaft wherein said rotor includes:
      a) an m-pole permanent magnet system, and
      b) an annular retention system arranged over said rotor to oppose centripetal force and retain said magnet system in place;
   and wherein electromagnetic interaction that generates n-phase AC signals in response to rotation of said rotor by said turbine system is limited to said m-pole permanent magnet system and said n-phase distributed winding; and
   an electrical system configured to facilitate rotation of said rotor in a start up operational mode of said turbine/alternator system and to extract said electric power from said n-phase AC signals during a power generation operational mode of said turbine/alternator system.

17. The turbine/alternator system of claim 16, wherein said annular retention system includes a composite sleeve positioned about said magnet system.

18. The turbine/alternator system of claim 16, wherein said annular retention system includes a non-magnetic ring positioned about said magnet system.

19. The turbine/alternator system of claim 16, wherein said magnet system includes rare earth magnets.

20. The turbine/alternator system of claim 16, wherein said stator includes a low loss, high permeability core.

21. The turbine/alternator system of claim 20, wherein said core defines a slot system and said n-phase distributed winding is carried in said slot system.

22. The turbine/alternator system of claim 20, wherein said core is comprised of electrical steel laminations.

23. The turbine/alternator system of claim 16, wherein said m-pole magnet system is a 4-pole magnet system and said n-phase distributed winding is a 3-phase distributed winding.

24. The turbine/alternator system of claim 16, wherein said alternator includes a selected one of a liquid and a gas cooling system configured to cool said stator.

25. The turbine/alternator system of claim 16, wherein said turbine system is a gas turbine driven system.

26. The turbine/alternator system of claim 16, wherein said electrical system includes:

a rectifier that rectifies said n-phase AC signals into a rectified signal;

a waveform generator;

an inverter that converts said rectified signal into said electric power in response to said waveform generator;

a filter system coupled to said inverter for filtering said electric power;

a DC power source; and a contactor system configured to decouple at least a portion of said filter system from said inverter, couple said DC power source to said inverter and couple said inverter to said n-phase distributed winding during said start-up operational mode.

* * * * *